United States Patent [19]

Shaw

[11] Patent Number: 4,594,858
[45] Date of Patent: Jun. 17, 1986

[54] HIGHLY EFFICIENT FLEXIBLE TWO-STAGE REFRIGERATION SYSTEM

[75] Inventor: David N. Shaw, Unionville, Conn.

[73] Assignee: Copeland Corporation, Sidney, Ohio

[21] Appl. No.: 636,068

[22] Filed: Jul. 30, 1984

Related U.S. Application Data

[63] Continuation of Ser. No. 569,886, Jan. 11, 1984, abandoned.

[51] Int. Cl.⁴ .................................................. F25B 1/10
[52] U.S. Cl. ..................................... 62/175; 62/228.3; 62/510
[58] Field of Search ............... 62/510, 175, 228.3; 417/2, 19, 248

[56] References Cited

U.S. PATENT DOCUMENTS

| | | |
|---|---|---|
| Re. 29,621 | 5/1978 | Conley et al. |
| 1,984,250 | 12/1934 | Chamberlain |
| 2,386,198 | 10/1945 | Dodson |
| 2,434,221 | 1/1948 | Newton |
| 2,585,908 | 2/1952 | Backstrom |
| 2,677,944 | 5/1954 | Ruff |
| 2,841,962 | 7/1958 | Richards |
| 2,903,248 | 9/1959 | Walker ........................ 417/248 |
| 3,307,368 | 3/1967 | Harnish |
| 3,513,662 | 5/1970 | Golber ........................ 62/175 |
| 3,759,052 | 9/1973 | Inoue |
| 4,102,149 | 7/1978 | Conley et al. |
| 4,332,144 | 6/1982 | Shaw |
| 4,435,962 | 3/1984 | Mochizuki et al. |

Primary Examiner—William E. Wayner
Attorney, Agent, or Firm—Harness, Dickey & Pierce

[57] ABSTRACT

A refrigeration system characterized by a first stage booster compressor feeding multiple parallel connected second stage compressors in an otherwise conventional closed loop refrigeration system utilizing an economizer between the condenser and evaporator and returning economizer vapor to the inter-stage pressure point between the first stage and second stage compressors operates in a very flexible and highly efficient manner by driving the booster, first stage compressor at variable speed and the second stage compressor(s) at constant speed, at maximum capacity, with those machines incapable of being unloaded. The control system utilizing a sensor for sensing evaporator pressure, evaporator temperature or suction pressure, varies the speed of the drive motor for the first stage booster compressor to initially slow down the booster and secondly connect or disconnect the second stage compressor from the system. The booster is always operating and the economizer is always active in the system. Since the high stage machines do not unload, they always operate at their peak efficiency.

16 Claims, 2 Drawing Figures

HIGHLY EFFICIENT FLEXIBLE TWO-STAGE REFRIGERATION SYSTEM

This application is a continuation of application Ser. No. 569,886, filed Jan. 11, 1984 now abandoned.

FIELD OF THE INVENTION

This invention relates to refrigeration and air conditioning systems employing multi-stage compressors, and more particularly, to a system utilizing an economizer for subcooling the condensed refrigerant prior to vaporization in the evaporator, and to an arrangement rendering high flexibility to multiple compressor operations while maximizing the efficiency of the refrigeration system bearing the first and second stage compressors.

BACKGROUND OF THE INVENTION

Supermarkets today typically use three single stage compressors in parallel which turn on and off on suction pressure. Such systems typically have no economizer and thus the efficiency is low because the compression ratios are high and there is much cycling of the compressors and the suction pressure control band is still quite wide. These factors contribute to inefficiency and lack of reliability.

It is, therefore, a primary object of the present invention to provide an improved multi-compressor refrigeration system in which the basic system still employs only three compressors, one booster and two high stage compressors, wherein the system employs an economizer which is constantly active within the system and which requires only two basic transducers for total system control.

SUMMARY OF THE INVENTION

The present invention is directed to a refrigeration circuit which comprises at least one first stage compressor, two second stage compressors, a condenser, an economizer, an evaporator, and conduit means bearing a compressible refrigerant working fluid in connecting the first stage compressor, the second stage compressors as a group, the condenser, the economizer, and the evaporator, in series, in that order, in a closed loop and with the second stage compressors in parallel with each other. The conduit means further comprises means for bleeding a portion of the condensed refrigerant from the closed loop downstream of the condenser and expanding it within the economizer for subcooling the liquid refrigerant within the closed loop being fed to the evaporator and for returning this expanded refrigerant as relatively high pressure refrigerant vapor to an intermediate pressure point within the closed loop between the outlet of the first stage compressor and the inlet to the second stage compressors. Means are provided for expanding the supercooled high pressure liquid refrigerant downstream of the economizer at the evaporator. Motors are provided for driving the compressors, and the system includes means for controlling operation of the first and second stage compressors including means for selectively energizing the second stage compressor motors and for controlling refrigerant flow selectively to the second stage compressors. The improvement comprises driving the first stage booster compressor at a variable speed to effect a large variation in flow rate of the refrigerant passing therethrough, and wherein the second stage compressors comprise compressors fixedly operating at maximum load and thus operating at their peak efficiency, such that the inter-stage pressure is maintained reasonable and wherein the control means comprises a first transducer for sensing any one of evaporating pressure, evaporating temperature or suction pressure, and second transducer means for sensing inter-stage pressure of the refrigerant circulating in the closed loop for controlling the speed of the first stage booster compressor such that initially control is achieved by slowing down the booster and second when the inter-stage pressure reaches a predetermined minimum, one of the second stage compressors is shut down; whereby, the inter-stage pressure automatically rises and increases the load on the remaining high stage compressor.

Any or all of the compressors may be reciprocating compressors, helical screw rotary compressors, sliding vane rotary compressors, or scroll compressors. The motor for driving the first stage booster compressor may constitute an induction motor using a variable speed inverter drive, with the frequency varying between 20 to 100 Hrz.

DESCRIPTION OF THE PREFERRED EMBODIMENT

Figure 1:
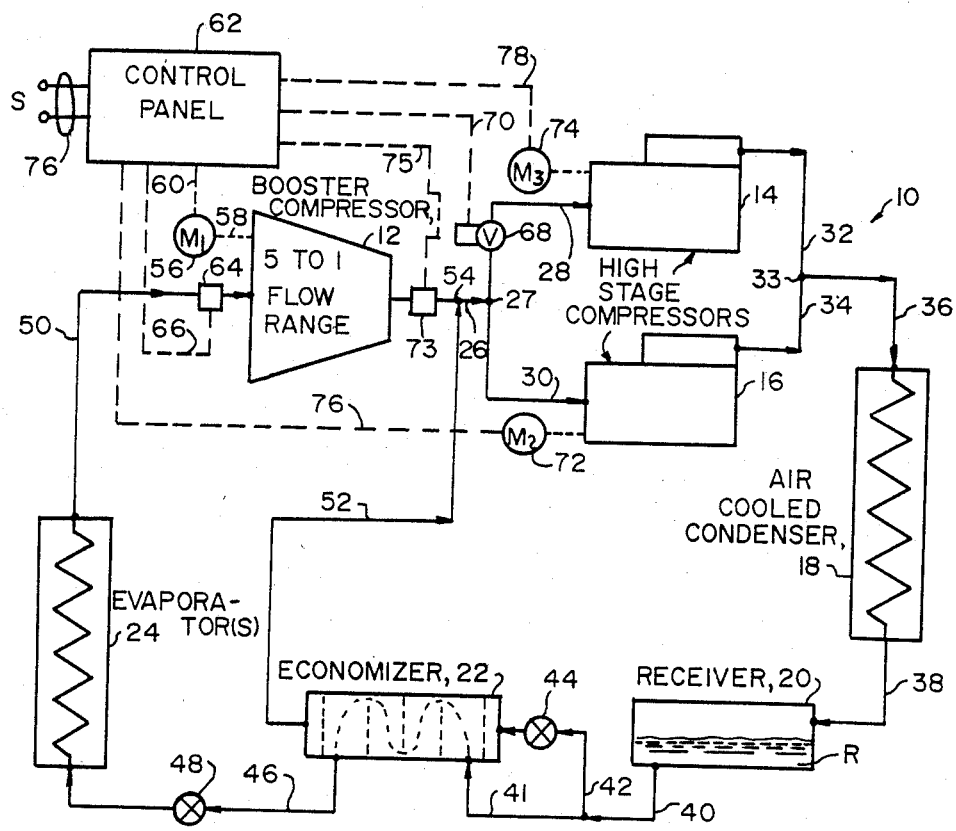
FIG. 1 is a schematic diagram of a closed loop refrigeration circuit forming a preferred embodiment of the present invention.

Referring to FIG. 1, there is shown a closed loop refrigeration system forming a preferred embodiment of the present invention as at 10. The closed loop system includes a first stage, booster compressor 12, a pair of second or high stage compressors as at 14, 16, an air cooled condenser 18, a receiver 20, an economizer 22, and an evaporator or evaporators 24 which are basic components of the closed loop refrigeration system 10. Conduit means function to connect the elements in series with the two high stage compressors 14, 16 in parallel as a group within the closed loop series circuit. As such, conduit 26 bearing a suitable refrigerant working fluid such as R-502 branches at point 27, into parallel conduits 28 and 30 to provide the output of the booster first stage compressor 12 at intermediate pressure to the suction side or inlets for the second stage compressors 14, 16. The outputs of the second stage compressors 14, 16 join via conduits 32 and 34 at junction 33 from which high pressure compressed refrigerant vapor is fed to the inlet of the air cooled condenser 18 via conduit 36. The outlet of the air cooled condenser permits the condensed refrigerant to flow to receiver 20 via conduit 38. As indicated, the refrigerant R in liquid form within receiver 20 flows via conduit or line 40 to the economizer 22. At point 41, a bypass or bleed line 42 permits a portion of the liquid refrigerant R to be bled from the primary closed loop circuit and to expand via an expansion valve 44 within economizer 22 functioning to subcool the major portion of the liquid refrigerant which passes directly to the evaporator or evaporators 24 via line 46. This subcooled liquid refrigerant expands via expansion valve 48 into and within the evaporator or evaporators 24 to perform a useful function within the refrigeration system. The refrigerant vapor returning from the evaporator or evaporators 24 flows via line 50 to the suction or low side of the booster first stage compressor 12, completing the closed loop circulation.

Meanwhile, the refrigerant bled via line 42 which vaporizes within the economizer to perform the cooling effect, passes via line 52 to an intermediate pressure point as at 54 within the system opening to conduit 26 connecting the outlet of the first stage compressor to the inlet of either or both second stage compressors 14, 16. It should be noted that while only two second or high stage compressors 14, 16 are shown, there may be three or more high stage compressors, all connected in parallel and suitably controlled. The system illustrated is purposely limited to two high stage compressors 14, 16.

The refrigeration system as illustrated allows highly efficient refrigeration to take place utilizing one or more evaporators 24 under all load conditions due to its constant use of an economizer cycle, i.e. the booster first stage compressor 12 is always operating but the economizer 22 is always active. Purposely, two high stage compressors 14, 16 are used in order that the inter-stage pressure variation does not become unmanageable. Also, the high stage machines, which may be reciprocating compressors without load capacity, do not unload and thus always operate at their peak efficiency. The booster first stage compressor 12 may be a variable speed reciprocating compressor, although it could be a variable speed screw compressor, variable speed sliding vane rotary compressor, etc. It is also possible to use a variable speed turbo compressor, i.e. centrifugal compressor.

The goal of the system is the highest possible efficiency, and the system basically employs a booster compressor 12 operating at variable speed combined with two or more high stage machines of fixed capacity in order that the inter-stage pressure is maintained reasonable.

In the illustrated system, a motor $M_1$ as at 56 is connected as indicated by dotted line 58 to the booster first stage compressor 12 in order to drive the same at variable speed and provide preferably a five to one flow range or better for the refrigerant R passing through the compressor. In turn, the second stage compressor 16 is directly driven by a second motor $M_2$ as at 72, while motor $M_3$ as at 74 directly drives the other second stage compressor 14.

The control system is inherently simple and stable. The system as illustrated employs a control panel as at 62 connected to a source S via leads 76. Power is thus supplied via the control panel 62 to motor 56 via electrical supply line 60. The system utilizes two transducers. The first transducer 64 is a pressure transducer as illustrated and senses the suction pressure to the first stage booster compressor 12 and is shown as being in line 50 supplying refrigerant from the evaporator or evaporators 24 to compressor 12 at the inlet or suction side of the booster compressor 12. Alternatively, the transducer 64 could be transducer sensing the evaporating pressure or evaporating temperature for the evaporator or evaporators 24. The signal for transducer 64 is sent to the control panel 62 via line 66. The second transducer 73 senses the inter-stage pressure, and in this case is connected within line 26 which feeds the discharge from the first stage compressor to the inlet side of the second stage compressors 14, 16. Pressure transducer 73 supplies a signal via line 75 to the control panel 62. In addition to line 60, which emanates from the control panel 62 and whose function is to vary the speed of the drive motor 56 directly driving the booster compressor 12, a number of other lines emanate from the control panel 62 and extend to various components of the system. In that respect, a control line 70 connects the control panel 62 to a solenoid operated valve 68 which is positioned within line 28 leading to the inlet of the second stage compressor 14 and functions to selectively cut out the second stage compressor 14 from the system under certain conditions which will be explained hereinafter. Control line 76 emanates from the control panel 62 and supplies current to the motor 72 which directly drives the second stage compressor 16. A supply line 78 extends from the control panel 62 to motor 74 functioning to directly drive the second stage compressor 14.

Under operation, as the refrigerant requirement falls for the evaporator or evaporators 24, the suction pressure at the inlet of the booster compressor 12 will drop and transducer 64 supplies a control signal via line 66 to the control panel evidencing the drop in suction pressure. In turn, the control panel 62 varies the current flowing to the drive motor 56 so as to slow down the booster compressor and thereby decrease the flow of refrigerant through the first stage compressor 12. The motor 56 may comprise an induction motor using a variable speed inverter drive in which case the control panel 62 will function to vary the frequency of the current flow supplied to the motor 56 via line 60. For a five to one flow range for the booster compressor 12, the variance in frequency of the control signal to motor 56 may be from 20 to 100 Herz.

When the inter-stage pressure reaches a predetermined minimum, one of the two second stage compressors will be shut down, and the inter-stage pressure will automatically rise and increase the load on the remaining high speed stage compressor or compressors. In the illustrated system, the second transducer 73 sensing inter-stage pressure will supply a signal indicative of the further reduction in inter-stage pressure via line 75 to the control panel 62. The control panel 62 will then shut down the compressor as at 14 by terminating energization of that drive motor 74 via line 78. Simultaneously, if needed, the solenoid operated control valve 68 will change state to shut off refrigerant flow through line 28 leading to the second stage compressor 14 via line 70.

Figure 2:
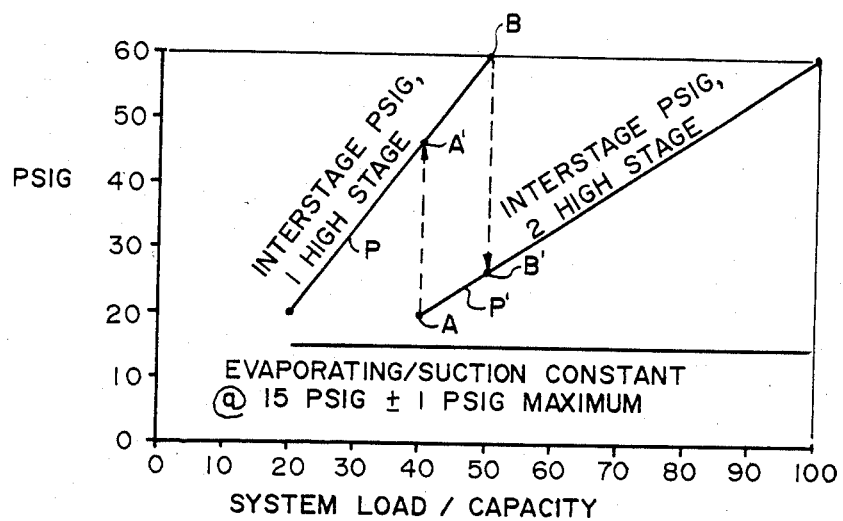
FIG. 2 is a plot of inter-stage pressure for the system of FIG. 1 against the sytem load/capacity illustrating the simplified control and flexibility of that refrigeration system.

The system operation is graphically illustrated in FIG. 2 which is a plot inter-stage pressure against system load/capacity. The two parallel solid plot lines P and P' are interstage pressure plots depending upon the operation of one or two high stage machines. Plot P is for a single second stage compressor while plot P' covers higher system load/capacity operations from 40 to 100 percent. Assuming, for instance, that the system is operating at conditions of low load with a single second stage compressor in operation, i. e. second stage compressor 16 and keeping in mind that the booster first stage compressor is always operating and thus the economizer 22 is always active, when system operation is such that the inter-stage pressure reaches a high point along plot line P, i.e., for instance at a selected 60 psig point indicated at B on plot line P, the second high stage compressor 14 is cut in, the inter-stage pressure drops to a pressure of about 26 psig at point B' on the second plot line P' for two high stage compressor operation. As may be appreciated, since the load is rising, the inter-stage pressure at which high stage compressor 14 is restarted, is set higher than the rebalanced inter-stage pressure at which the second compressor shuts off, the shut off point on plot line P' being at A which is a pressure of about 20 psig as illustrated for the system.

It should be kept in mind that the plot shown is for an efficient and reliable supermarket refrigeration system involving one or more evaporators 24 and forms the basis for a generic control philosophy or logic diagram wherein the refrigerant may be R-502 and the system having a −20° F. evaporating temperature. Under the system shown, there is an avoidance of excess cycling of the high stage compressors 14, 16 which will not seriously affect the system efficiency as the economizer is still always active. With the inter-stage pressure dropping along plot line P' to 20 psig and reaching point A, the system drops out the compressor 14 maintaining second stage compressor 16, and the inter-stage pressure immediately rises (for the same load) to approximately 46 psig. The single high stage compressor 16 maintains system operation as the basic load continues to fall and the booster compressor 12 is slowed down further by suitable control from the control panel 62 to the booster drive motor 56 via line 60. As stated previously, if the load increases after system transfer to the single high stage compressor 16, the speed of motor 56 increases appropriately providing an increase in the flow rate of the refrigerant through the first stage compressor 12 until, of course, the inter-stage pressure reaches a level of 60 psig (point B, plot line P) wherein the second stage compressor 14 cuts in and compresses refrigerant in parallel with the refrigerant passing through the other second stage compressor 16.

Under the illustrated system, with falling system load, suction pressure transducer 64 causes booster compressor 12 speed to fall. When inter-stage pressure reaches point A (plot line P'), one second stage compressor turns off and the inter-stage pressure rebalances (point A', plot line P). Rising load causes the booster compressor 12 to speed up and the second or next high stage compressor turns on at B, plot line P.

As may be appreciated, two basic transducers are the only input required for adequate control. One is required for measuring the suction pressure or its equivalent and one is required for measuring the inter-stage pressure of the closed loop refrigerant working fluid. The generic control logic is quite simple and straightforward, and a solid state control panel may be readily implemented to effect system control under the parameters disclosed herein. The refrigeration system is believed to be ideal for both commercial refrigeration as well as typical heat pumps for heating and cooling commercial and other buildings. The illustrated system utilizes only three compressors, one booster and two high stage compressors. The system includes adequate redundancy in that the high stage compressors alone can handle about 50 per cent of the maximum system load without the booster, and the booster and one high stage compressors can also handle about 50 per cent of the maximum system load as appreciated from the plots of FIG. 2. The booster horsepower is so low that it may be reasonable to equip it with an inverter or a brushless DC drive to provide the variable speed necessary for the system.

While the invention has been particularly shown and described with reference to a preferred embodiment thereof, it will be understood by those skilled in the art that various changes in form and details may be made therein without departing from the spirit and scope of the invention.

What is claimed is:
1. A refrigeration circuit comprising:
   a first stage compressor,
   at least two second stage compressors,
   a condenser,
   an economizer,
   an evaporator,
   conduit means bearing a compressible refrigerant connecting said first stage compressors, said second stage compressors as a group, said condenser, said economizer, and said evaporator, in series in a closed loop in that order, said second stage compressors being in parallel with each other,
   said conduit means further comprising means for bleeding a portion of the condensed refrigerant from said closed loop downstream of said condenser and expanding it within said economizer for subcooling liquid refrigerant fed by said closed loop to said evaporator and for returning expanded refrigerant at relatively high pressure from said economizer to an inter-stage point between the outlet of the first stage compressor and the inlet of said second stage compressors,
   motors for driving said compressors, and
   means for controlling operation of said first and second stage compressors including means for selectively driving said second stage compressor motors and for selectively controlling refrigerant flow to and from said second stage compressors,
   said first stage compressor motor is a variable speed motor,
   said second stage compressors are fixed capacity compressors,
   said control means comprises first sensing means for sensing a condition of said system upstream of said first stage compressor, second sensing means for sensing an inter-stage refrigerant condition, and means responsive thereto for initially varying the speed of operation of said first stage compressor and secondly for shutting down said second stage compressors, in order, when said inter-stage condition reaches a predetermined minimum, such that said booster first stage compressor is always operating, and the economizer is always active, and
   said second stage compressors insuring that the inter-stage condition variation is maintained within a desired range.
2. The refrigeration system as claimed in claim 1, wherein said control means includes means for selectively closing off inter-stage refrigerant flow from said first stage booster compressor to at least one of said second stage compressors.
3. The refrigeration system as claimed in claim 1, wherein said control means comprises means for terminating energization of the drive motor for at least one of said second stage compressors.
4. The refrigeration system as claimed in claim 1, wherein sensors comprise a first sensor for sensing suction pressure for said first stage booster compressor and a second sensor for sensing the inter-stage pressure of the refrigerant.
5. A refrigeration circuit comprising:
   a variable capacity first stage compressor;
   at least two fixed capacity second stage compressors;
   conduit means bearing a compressible refrigerant connecting said first stage compressor to said second stage compressors, said second stage compressors being connected in parallel with each other, motors for driving said compressors; and control means including sensing means for sensing inter-stage refrigerant pressure within said conduit means and means responsive thereto for shutting down at least one of said second stage compressors, when the inter-stage pressure reaches a predetermined minimum.

6. A refrigeration circuit comprising:
a variable capacity first stage compressor;
variable capacity second stage compressor means;
a condenser;
an evaporator;
conduit means bearing a compressible refrigerant interconnecting said first stage compressor, said second stage compressor means, said condenser and said evaporator, in series in a closed loop, in that order;
motors for driving said first stage compressor and second stage compressor means; and
control means utilizing only two sensors for controlling capacity modulation, the first sensor sensing a condition on the suction side of the first stage, and the second sensor sensing a condition on the suction side of said second stage compressor, and means responsive to said sensors for initially varying the capacity of said first stage compressor and secondly for varying the capacity of said second stage compressor means so that the inter-stage pressure is maintained within a desired range.

7. A refrigeration circuit as set forth in claim 6 further comprising an economizer,
said conduit means connecting said economizer between said condensor and said evaporator, and further comprising means for bleeding a portion of the condensed refrigerant from said closed loop downstream of said condenser and expanding it within said economizer for subcooling liquid refrigerant fed by said closed loop to said evaporator and for returning expanded refrigerant at relatively high pressure from said economizer to an inter-stage pressure point between the outlet of the first stage compressor and the inlet of said second stage compressor means.

8. A refrigeration circuit as claimed in claim 6, wherein said second stage compressor means comprises at least two second stage fixed capacity compressors.

9. A refrigeration circuit as set forth in claim 8 wherein said first stage compressor motor is a variable speed motor.

10. A refrigeration circuit comprising:
a variable capacity first stage compressor;
a second stage compressor;
a condenser;
an evaporator;
conduit means bearing a compressible refrigerant interconnecting said first stage compressor, said second stage compressor, said condenser, and said evaporator, in series in a closed loop, in that order;
motors for driving said compressors; and
control means comprising first sensing means for sensing a condition on the suction side of the first stage, and second sensing means for sensing inter-stage refrigerant pressure, and means responsive thereto for initially varying the capacity of said first stage compressor and secondly for shutting down said second stage compressor when the inter-stage pressure reaches a predetermined minimum.

11. A refrigeration circuit comprising:
first stage compressor means;
at least two fixed capacity second stage compressors;
conduit means bearing a compressible refrigerant connecting said first stage compressor to said second stage compressors, said second stage compressors being connected in parallel with each other;
motors for driving said compressors; and
control means including sensing means for sensing inter-stage refrigerant pressure within said conduit means and means responsive thereto for shutting down at least one of said second stage compressors, when the inter-stage pressure reaches a predetermined minimum.

12. A refrigeration circuit comprising:
first stage compressor means;
variable capacity second stage compressor means;
a condenser;
an evaporator:
conduit means bearing a compressible refrigerant interconnecting said first stage compressor means, said second stage compressor means, said condenser and said evaporator, in series in a closed loop, in that order;
motor means for driving said first stage compressor means and said second stage compressor means; and
control means utilizing only two sensors for controlling capacity modulation, the first sensor sensing a condition on the suction side of the first stage, and the second sensor sensing inter-stage refrigerant pressure, and means responsive to said sensors for varying the capacity of said second stage compressor means so that the inter-stage pressure variation is maintained within a desired range.

13. A refrigeration circuit comprising:
a variable capacity first stage compressor;
at least two fixed capacity second stage compressors;
conduit means bearing a compressible refrigerant connecting said first stage compressor to said second stage compressors, said second stage compressors being connected in parallel with each other;
motors for driving said compressors; and
control means for controlling said first stage compressor and said second stage compressors, said control means being operable to vary the capacity of said first stage compressor while said second stage compressors are operating, to shut down one of said second stage compressors when the capacity of said first stage compressor reaches a predetermined minimum and thereafter to increase the capacity of said first stage compressor while continuing to operate the remaining second stage compressors.

14. A refrigeration circuit as claimed in claim 13 wherein said control means includes sensing means for sensing inter-stage refrigerant pressure within said conduit means and means responsive thereto for shutting down at least one of said second stage compressors when the inter-stage pressure reaches a predetermined minimum.

15. A refrigeration circuit comprising:
a first stage variable capacity compressor;
a plurality of second stage compressors;
conduit means bearing a compressible refrigerant interconnecting said first stage compressor with said second stage compressors; and
control means for modulating the capacity of said second stage compressors in response to the pressure in said conduit means between said first and second stage compressors.

16. A refrigeration circuit comprising:
variable capacity first stage compressor means;
second stage compressor means;
a condenser;
an evaporator;
conduit means bearing a compressible refrigerant interconnecting said first stage compressor means, said second stage compressor means, said condenser, and said evaporator, in series in a closed loop, in that order;
motors for driving said compressor means;
an economizer operatively disposed between said condenser and evaporator for expanding a portion of the condensed refrigerant from said closed loop downstream of said condenser for subcooling refrigerant flowing to said evaporator;
means for feeding said expanded portion of refrigerant to an inter-stage point between the outlet of said first stage compressor means and the inlet of said second stage compressor means; and
control means for controlling the operation of said second stage compressor means in response to a condition at said inter-stage point.

* * * * *

UNITED STATES PATENT AND TRADEMARK OFFICE
CERTIFICATE OF CORRECTION

PATENT NO. : 4,594,858

DATED : June 17, 1986

INVENTOR(S) : David N. Shaw

It is certified that error appears in the above-identified patent and that said Letters Patent is hereby corrected as shown below:

Column 3, line 6, "cooling" should read -- subcooling --.

Signed and Sealed this

Ninth Day of December, 1986

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,594,858
DATED : June 17, 1986
INVENTOR(S) : David N. Shaw

It is certified that error appears in the above-identified patent and that said Letters Patent is hereby corrected as shown below:

ON THE TITLE PAGE, delete the Abstract and substitute in place thereof the following Abstract:

--A refrigeration system characterized by a first stage booster compressor feeding one or multiple parallel connected second stage compressors in a closed loop refrigeration system which may incorporate an economizer between the condenser and evaporator with the economizer vapor being returned to the inter-stage pressure point between the first stage and second stage compressors. The system operates in a very flexible and highly efficient manner and incorporates a control system utilizing a sensor for sensing evaporator pressure, evaporator temperature or suction pressure. In the embodiment shown, the control system varies the speed of the drive motor for the first stage booster compressor to vary its capacity, and also controls the second stage compressors.--

Signed and Sealed this

Twenty-fourth Day of February, 1987

Attest:

DONALD J. QUIGG

Attesting Officer

Commissioner of Patents and Trademarks